(12) United States Patent
Eiken et al.

(10) Patent No.: US 6,813,564 B2
(45) Date of Patent: Nov. 2, 2004

(54) METHOD FOR MONITORING SEAFLOOR SUBSIDENCE AND FOR GRAVITY MONITORING AN UNDERGROUND HYDROCARBON RESERVOIR

(75) Inventors: Ola Eiken, Trondeheim (NO); Mark Zumberge, San Diego, CA (US); John Hildebrand, San Diego, CA (US)

(73) Assignees: Den Norske Stats Oljeselskap A.S., Stavanger (NO); The Regents of the University of California, Oakland, CA (US)

( * ) Notice: Subject to any disclaimer, the term of this patent is extended or adjusted under 35 U.S.C. 154(b) by 206 days.

(21) Appl. No.: 10/149,515
(22) PCT Filed: Dec. 12, 2000
(86) PCT No.: PCT/NO00/00425
§ 371 (c)(1),
(2), (4) Date: Oct. 15, 2002
(87) PCT Pub. No.: WO01/42818
PCT Pub. Date: Jun. 14, 2001

(65) Prior Publication Data
US 2003/0093222 A1 May 15, 2003

(30) Foreign Application Priority Data
Dec. 13, 1999 (NO) ................................................. 996171

(51) Int. Cl.[7] .............................................. G06F 19/00
(52) U.S. Cl. ........................................ 702/5; 73/382 G
(58) Field of Search ................................ 702/5, 14, 16; 73/382 R, 382 G; 324/344

(56) References Cited
U.S. PATENT DOCUMENTS
3,996,794 A 12/1976 Helgans, Jr. ............. 73/170.29
4,884,030 A * 11/1989 Naville et al. .............. 324/344

(List continued on next page.)

FOREIGN PATENT DOCUMENTS
JP      10-351866 A     12/1993

Primary Examiner—John Barlow
Assistant Examiner—Victor J. Taylor
(74) Attorney, Agent, or Firm—Foley & Lardner LLP

(57) ABSTRACT

The invention is a method for monitoring subsidence of the sea-bed (14) of a survey area (8) caused by compaction of an underground hydrocarbon reservoir (1), and comprises the following steps: Conducting at least two series $(S_1, \ldots, S_i, \ldots, S_m)$ of time-indexed depth measurements $(13a, \ldots, 13n)$, with separation in time $\Delta$ between the measurement series characteristic of a significantly detectable long-term change of seafloor elevation due to compaction to take place in the reservoir. Measurements are time-indexed and corrected for tidal depth variations. Depth measurements (13) are conducted on survey stations (2) arranged on benchmarks (6) which have settled in the locally consolidated seabed (14). To handle short-term depth variations several stationary time-indexed short-time local reference depth measurement series (19r) are conducted at short-term local reference stations (18r) at benchmarks (6) during each separate measurement series $(S_i)$. The reference depth measurement series (19r) are continuous for correcting each depth measurement (13) for short-time tidal depth variations occuring during each separate measurement series $(S_i)$. To monitor compaction or seafloor subsidence during the series of measurements, the depth measurements (13, 19r) are conducted relative to a depth measurement (13r) during each series (S) at reference station (9) arranged on the seabed (14r) at a distance from the reservoir (8) being sufficiently far to be unaffected by long-term effects taking place due to compaction in reservoir (1).

29 Claims, 5 Drawing Sheets

U.S. PATENT DOCUMENTS

| | | | | |
|---|---|---|---|---|
| 4,904,943 A | * | 2/1990 | Takahashi | 324/344 |
| 5,159,833 A | * | 11/1992 | Graebner | 73/152.39 |
| 5,198,820 A | | 3/1993 | Graebner | 342/165 |
| 5,218,864 A | | 6/1993 | Pennybaker | 73/152.05 |
| 5,615,114 A | | 3/1997 | Nordin | 702/5 |
| 5,637,797 A | * | 6/1997 | Zumberge et al. | 73/382 R |
| 5,737,219 A | | 4/1998 | Vartanyan | 702/15 |
| 5,753,813 A | | 5/1998 | Hagiwara | 73/152.54 |
| 5,791,187 A | | 8/1998 | Chang | 73/299 |
| 6,612,171 B1 | * | 9/2003 | Stephenson et al. | 73/382 R |
| 6,640,190 B2 | * | 10/2003 | Nickel | 702/14 |

* cited by examiner delta g, microgal

METHOD FOR MONITORING SEAFLOOR SUBSIDENCE AND FOR GRAVITY MONITORING AN UNDERGROUND HYDROCARBON RESERVOIR

TECHNICAL FIELD OF THE INVENTION

The invention concerns a method and an apparatus for monitoring fluid movements and seafloor subsidence/reservoir compaction in hydrocarbon-producing fields by repeated relative seafloor gravity and depth measurements. Monitoring of hydrocarbon reservoir changes (as saturation, pressure, and compaction) during production is traditionally done by well measurements integrated through dynamic reservoir modelling. Geophysical techniques for measuring changes between the wells has emerged as useful technology in recent years, particularly repeated seismic measurements. The benefits of such observations and improved understanding of the reservoir behaviour during production are many: among others to optimize production/reservoir management, optimizing drilling of infill wells and improving estimates of remaining reserves.

TECHNICAL BACKGROUND, STATE OF THE ART

A new system comprising an instrument for use in seafloor gravity observations has been designed and deployed. The system is called "Remotely Operated Vehicle Deep Ocean Gravimeter" (ROVDOG). The aim of the project was to perform repeated measurements of gravity and pressure in an oilfield to monitor the development of the reservoir. The actual field in question is the Troll field in the North Sea. Because of the requirement for accurate location of the measurement points (each to within one cm of the previous observation) a gravimeter was required which could be handled by the arm of an ROV and placed atop sea floor benchmarks. Such an instrument has been designed around a Scintrex CG-3M land gravimeter. Motorized gimbals within a watertight pressure case are used to level the sensor. An assembly of 3 precise quartz pressure gauges 22 provides pressure measurements which can be transformed to depth information. The instrument may be operator-controlled via a serial datalink to the ROV. A view of the data stream for recording can be monitored. In one embodiment of the invention, the serial datalink is according to the RS-232 standard. In a test run of the system, the instrument was first deployed in the Troll field during June 1998. A total of 75 observations were made at 32 seafloor locations over a period of 120 hours. The repeatability figure of merit is 0.027 milliGal for the gravity measurement and 2 cm for pressure-derived heights.

Scope of Work

The Troll field licence partners decided in 1996 to try to perform measurements on the Troll field in order to montitor changes caused by the gas production and the influx of water from the aquifier in particular. Among different solutions comprising well monitoring and repeat seismic monitoring to perform such measurements, repeated gravity measurements on the sea floor above the field was proposed by the inventors. In an internal study in 1997 the changes of the gravity field were identified as comprising the following factors:

I) water influx in the gas reservoir;

II) seafloor subsidence; and

III) gas density reduction.

I) The expected increase in gravity caused by water influx.

II) The expected seafloor subsidence due to reservoir compaction. This seafloor subsidence will cause a change in the gravity field, as measured at the seafloor, being proportional to the subsidence, due to the vertical gradient of the Earth's gravity field. Thus it is necessary to monitor the gravity changes or "the gravity signal" to within a resolution of the gravity corresponding to an elevation difference of a few centimeters.

III) Gas density reduction will give a reduction of the mass density of the reservoir, causing a reduction of the gravity field, i.e. of opposite sign with respect to gas/water rise.

Fujimoto et al. in "*Development of instruments for seafloor geodesy*", Earth Planets Space, vol. 50, pp. 905–911, 1998, describes instruments for monitoring differential displacements across a fault zone in the seabed, and examines their resolutions through seafloor experiments at relatively short baselines. The horisontal differential displacement is measured by an acoustic ranging system using a linear pulse compression technique being able to measure distances on the order of 1 km between markers with an accuracy of 1 cm. The leveling or vertical displacement monitoring of the seabed is planned to use an array of ocean bottom pressure gauges and an ocean bottom gravimeter to detect differential vertical motion. The system is estimated to have a resolution of several centimeters in vertical displacement. Fujimoto et al describes how ocean bottom pressure measurements can be used in two ways to detect vertical movements of the seafloor. An ocean bottom pressure array acts as a monitoring system of relative vertical movements. Variations of atmospheric pressure are mostly compensated at the sea surface. By simulating pressure and gravity one can discriminate between a pressure change due to vertical seafloor displacements and a pressure change due to vertical sea surface displacements:

Consider the seafloor rising by 1 cm. The pressure value will decrease by 1 cm of water column. Gravity will decrease by 2.2 microGal (−3.068 microGal due to height change and +0.864 microGal due to reduced gravitational attraction of the global sea water).

Next, Consider the sea surface lowering 1 cm. The pressure in this case will also decrease by 1 cm of water column. The gravity in this case will increase by 0.432 microGal due to the reduced gravitational attraction of the local seawater.

In both of the above mentioned cases, pressure monitored at the seabed decreases, but the gravity changes differently. If measurements are performed with high accuracy, simultaneous measurements of pressure and gravity can discriminate between the two effects: sea surface level change and seabed level change.

Fujimoto et al. do not propose any method for monitoring changing parameters representing density and/or mass distribution of an underground sub-sea reservoir by means of gravimetric measurements with a gravity sensor on the sea-bed. Fujimoto proposes conducting series of relative gravimetric measurements with a gravity sensor and relative depth measurements with a depth sensor on survey stations arranged on a benchmark having fixed vertical position relative to the local sea-bed in a survey area over a suspected fault zone, the gravimetric measurements being relative to gravimetric measurements and depth measurements taken on a reference station on land. Fujimoto proposes correcting the relative gravimetric measurements for the corresponding relative depth measurements, producing corrected relative gravity values. The corrected gravimetric values are then used for interpreting seabed vertical motions, and not used for comparison between series of observed corrected gravimetric values with later series of observed corrected gravity values and interpretation of a difference of corrected gravimetric values in terms of a change of parameters representing density and/or mass displacement in the underground sub-sea reservoir. Although seabed subsidence monitoring over the reservoir zone is one major issue of the present invention, the gravity change represented by seabed subsidence is noise with respect to detecting gravity changes due to mass movements and density change in the reservoir. Thus, in the present invention, the gravity measurement due to seabed subsidence (or rise) must, in addition to tidal and drift corrections, be corrected for by corresponding water column pressure changes at the seabed.

Presentation of Relevant Known Art

Gravity monitoring has previously been applied in exploiting hydrothermal energy (Allis, R. G, and Hunt, T. M., Geophysics 51, pp 1647–1660, 1986: *Analysis of exploitation-induced gravity changes at Wairakei geothermal field.*; San Andres, R. B, and Pedersen, J. R., Geothermics 22, pp 395–422, 1993, *Monitoring the Bulalo geothermal reservoir, Philippines, using precision gravity data.*), and in volcanology (Rymer, H. And Brown, G. C., J. Volcanol. Geotherm. Res. 27, pp. 229–254, 1986, *Gravity fields and the interpretation of volcanic structures, geological discrimination and temporal evolution.*). Recently, efforts on measuring gravity differences above hydrocarbon fields on land have been reported (Van Gelderen, M., Haagmans, M. R., and Bilker, M., Geophysical Prospecting 47, pp. 979–993, 1996, *Gravity changes and natural gas extraction in Groningen*). For offshore fields, gravity monitoring has been initiated in a case known to us (Hare, J., Ferguson, J. F., Aiken, C. L. V., and Brady, J. L., 1999, The 4-D microgravity method for waterflood surveillance: *A model study for the Prudhoe Bay reservoir*, Alaska.), with measurements being performed from the surface of the ocean ice, a non-actual situation for most hydrocarbon fields in question. The relatively small gravity changes expected due to reservoir parameters as compared to the gravity variations due to noise and external variations as tides and diurnal gravity variations, requires better accuracy than has been achieved in marine geophysical surveys to date.

Existing underwater gravity meter systems are based upon lowering the gravity instrument from a ship (LaCoste, 1967; Hildebrand et al., 1990). Other systems make use of manned submersible vessels for taking measurements from within the crew compartment of the submersible vessel (Holmes and Johnson, 1993; Cochran et al, 1994, Evans, 1996; and Ballu et al., 1998). The problem of relocating the gravity meter observation point relative to the seafloor to within approximately 2 centimeters in the vertical line, is pronounced in the attempts of using a gravity meter inside a manned submersible vessel. The method is also slow in operation, and highly expensive, and running a manned submersible vessel may pose a risk to the crew. Wave action on the vessel is another noise acting on the gravity meter, and so is the noise due to inadvertent movement of the crew.

Actual Problems Implied with the Known Art

Gravity measurements taken on a surface ship or inside a submarine in motion require absolute velocity and course determination in order to perform an Eötvös correction. Shipborne measurements of gravity are notoriously noisy due to the ship's accelerations from sea waves and wind, so the measurements must be low-pass filtered over long periods.

General navigation problems makes repeat measurements made by submarine or ROV uncertain with respect to position and elevation. The elevation uncertainty depends on the uncertainty of horisontal position and the local inclination of the seabed. The position and elevation problem of the known art is remedied by the present invention.

Another problem is represented by the generally unconsolidated sedimentary seabed surface. The unconsolidated sedimentary surface gives inconsistent subsidence of the gravity measurement package, either being a bottom gravity meter lowered in a cable from a ship or set out by an ROV, or measurements taken from inside a manned submarine resting on the seabed.

Drift of the gravity meter requires frequent reoccupations to the reference station. Thus the long transport time to a land-based reference station makes frequent returns to a land-based reference station unfeasible.

Use of a sea-bed reference station in a shaft near the seabed would not solve the problem with gravimeter drift of the field instrument being carried around by an ROV.

Solution to the Problem and Reference to the Claims

The above-mentioned problems are largely reduced by a method for depth measurements and monitoring of a seabed subsidence due to compaction in a hydrocarbon reservoar according to the invention defined in the attached set of claims.

The method according to the invention removes the need for making an Eötvös correction for vessel speed and vessel course of the gravity measurements because the measurements according to the present method are made stationary at the seabed. The measurement of gravity and depth are done stationary, thus no velocity corrections are needed.

The method according to the invention using measurement stations on preinstalled benchmarks removes the measurement position uncertainty of position reoccupation to within the small area of the top surface of the benchmark, thus also removing a significant portion of the uncertainty of elevation reoccupation due to seabed inclination, by the same means.

The method according to the invention using measurement stations on preinstalled measurement stations on benchmarks reduce the problems with "rapid" subsidence of the measurement vessel sinking in the loose sedimentary seabed due to the softness and unstability of the upper unconsolidated layers of the sediments. Heavy benchmarks which are perforated and made in concrete are preinstalled at the seabed and left to settle in the sediments for several weeks or months before a first series $S_1$ of gravity and depth measurements. By this, two essential problems are solved:

(a) The elevation of the measurement station (with respect to the local consolidated seabed, not with regard to the earth's gravity centre) is constant to within millimeters during a series of measurement series $S_1, S_2, \ldots, S_m$ taking place during several months or years.

(b) Vertical (and possibly horizontal) acceleration experienced during to slow sinking and slow settling of the measurement vessel in the local unconsolidated sediments may explain the gravity phenomenon described in Fujimoto et al., see FIG. 5 and the text at p. 910, at the bottom of the left column.

The measurement stations at preinstalled benchmarks according to the present invention prevents such sinking and settling accelerations during the measurement at each particular station.

The method according to the invention using a reference station at the seabed in the vicinity of the survey area 8 makes the return time to the reference station on the order of hours. Reoccupying a reference station onshore, as done in the known art, requires returning the gravity vessel from the seabed to the surface and making a gravity measurement either on land or at shallow depth.

All transport may incur mechanical stress that may change the instrument's drift rate.

In the known art, the depth or pressure sensor is arranged on the submarine's outer hull surface or other places which may not be exactly of the same relative depth with respect to the gravity sensor. According to the present invention, the depth or pressure sensor is arranged in the same elevational position with respect to the gravity sensor, the pressure sensors being arranged on the outside of the gravity sensor water-tight pressure housing. Thus the relative depth between the gravity sensor and the pressure sensors should be repeatable within far less than 1 cm, depending only on the tilt of the water-tight housing resting on the station on the benchmark.

None of the existing systems are capable of meeting the geophysical accuracy, operational speed and economical requirements of the task presented by the actual monitoring of a subsea gas reservoir, together with the need to precisely relocating the gravity instrument on the seafloor. On this background, the inventors came up with a new method and a new instrument according to the invention, solving the problems of the disadvantages of the known art.

SHORT DESCRIPTION OF THE DRAWING FIGURES

DESCRIPTION OF THE PREFERRED EMBODIMENT

Mechanical System

Figure 1A:
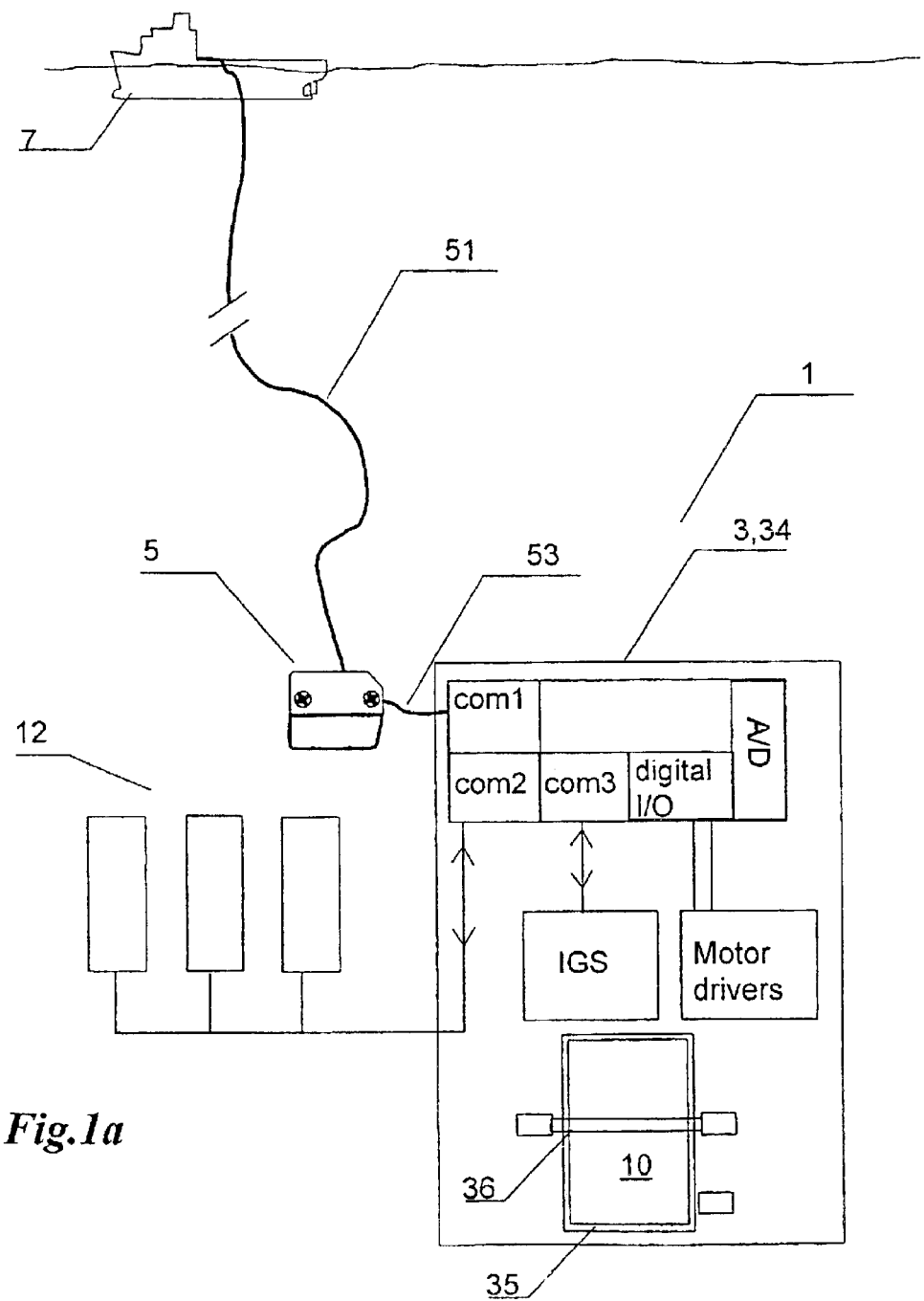
FIG. 1a illustrates the pressure and gravity sensor package connected to an ROV, further connected to a surface ship.
Figure 1B:
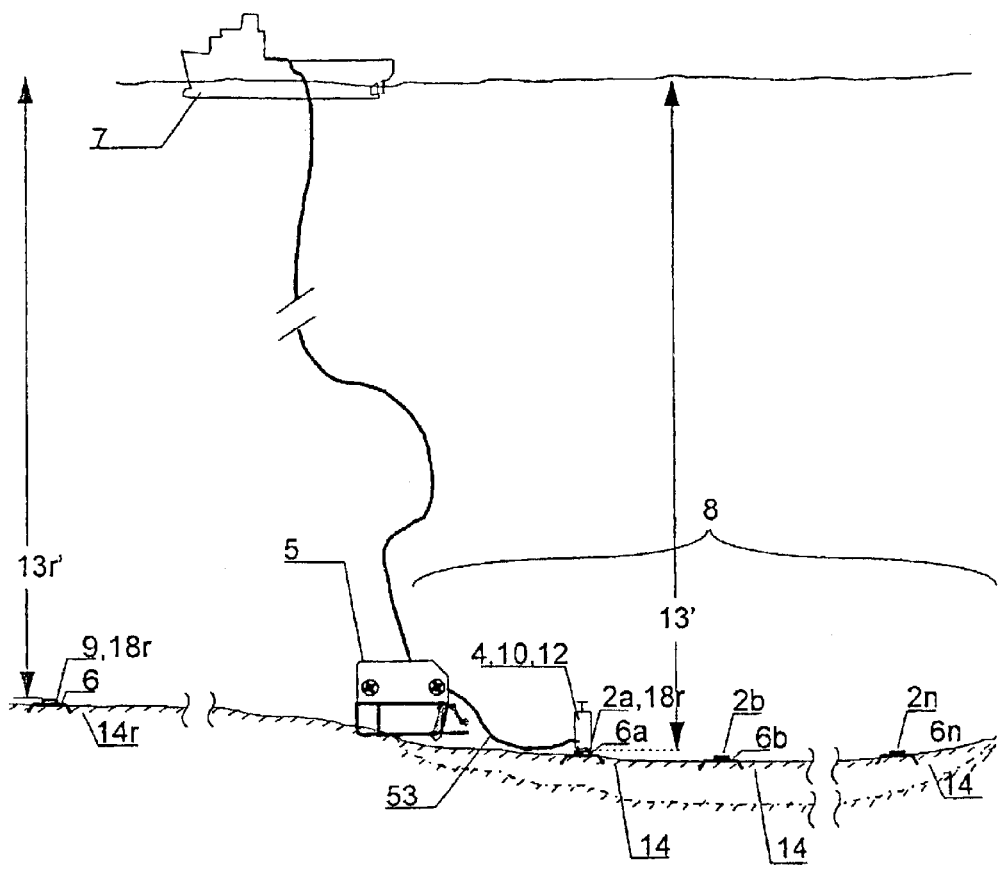
FIG. 1b illustrates a seafloor geophysical setting, with seafloor subsidence occuring at long term, and with an underground reservoir to be monitored.
Figure 1B:
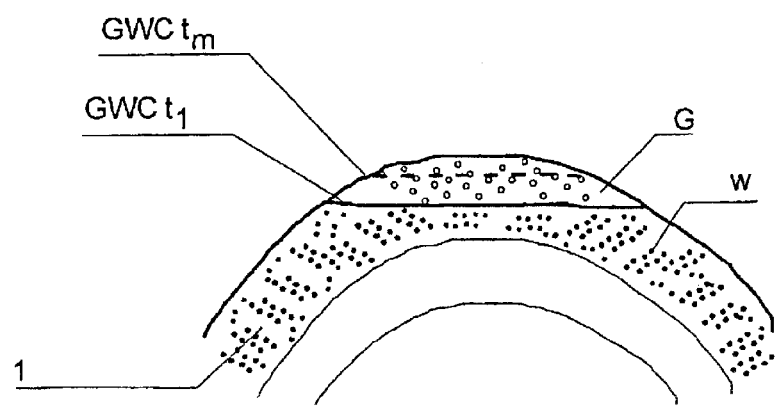

The preferred embodiment of the gravity and pressure sensor system is shown in FIG. 1a and comprises a sea-floor deployable system 1 having a gravity sensor system 3 comprising a gravity sensor 10 in a water-tight pressure housing 34 provided with thermal isolation 35. A double-gimbal frame 36 comprise two orthogonally arranged gimbal frames 36x and 36y supporting the gravity sensor housing 34 free to swing +/−8 degrees about an x-axis 37x and +/−9 degrees about a y-axis 37y. Thus a tilt of +/−12 degrees is allowed about the x-y coordinate diagonal axis. This given freedom to swing about two orthogonal axes has proved sufficient for the tilts encountered in a field test illustrated in FIG. 1b showing the gravity sensor system 3 placed on a benchmark 6 arranged on a local sea-bed station 14a, . . . ,14n in a survey area 8, or a reference station sea-bed 14r. The preferred embodiment of the benchmark 6 will be described below. One or more depth sensors 12 are arranged outside the pressure housing 34 for a fixed relative elevation in their operational position on the station 2,9 with respect to the gravity sensor 10.

The Method According to the Invention; Subsidence

Figure 3:
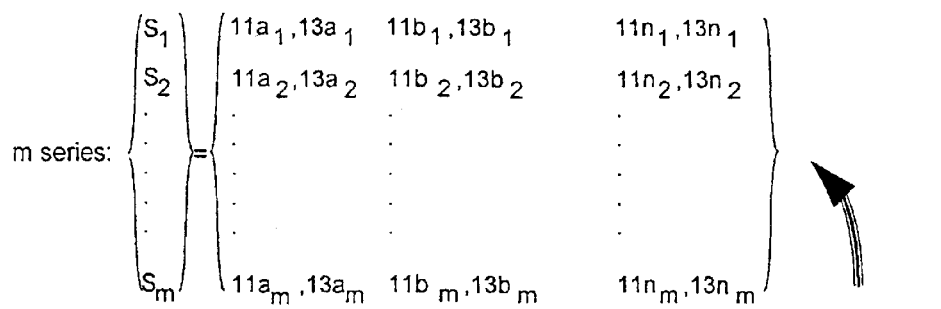
FIG. 3 illustrates subsidence of the seafloor and illustrates a method of monitoring seafloor subsidence, and a corresponding gravity and depth parameter measurement matrix built up during a long-term series of measurements.
Figure 3:
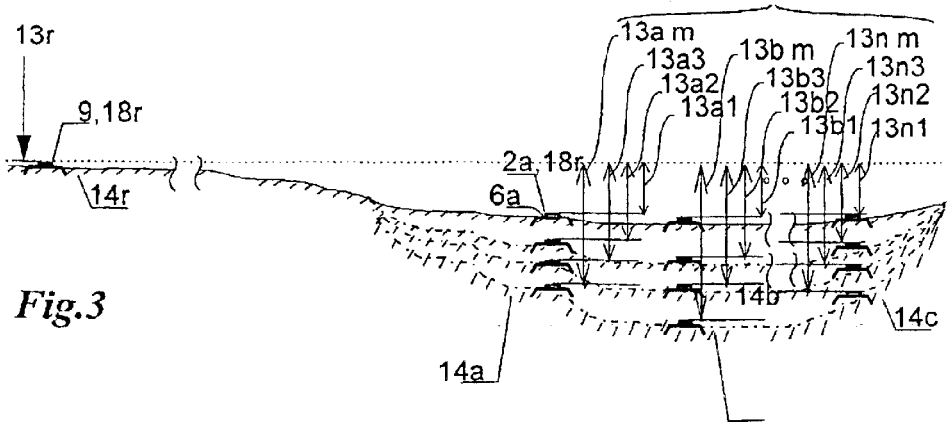

A method is illustrated in FIG. 1b and also in FIG. 3, for monitoring subsidence of the sea-bed 14 of a survey area 8 caused by compaction of an underground hydrocarbon reservoir 1. The method of the invention comprises the following steps:

Conducting at least two series $(S_1, \ldots, S_m)$ of depth measurements, each series $S_i$ comprising at least one time-indexed depth measurement $13a,13b, \ldots ,13n$. Depth mesurement $13a_1$ is conducted at a seabed station 2a during measurement series $S_1$; measurement $13b_1$ is conducted on station 2b during series $S_1$, depth mesurement $13a_2$ is conducted at seabed station 2a during measurement series $S_2$, and so on. A separation in time $\Delta t$ between at least two of the measurement series $(S_1, \ldots, S_i, \ldots, S_m)$, i.e. at least the time between the first and the last series $S_1$ and $S_m$ should be characteristic of a significantly detectable long-term change of seafloor elevation, possibly due to compaction, to take place in the reservoir 1, if such a change occurs. The tidal measurements should be time-indexed in order to be corrected for tidal depth variations which will be described below. In practice, the depth measurements are conducted by measuring the absolute pressure, being proportional to the weight of the unit area water column and the air column above the pressure sensor. A clock (16) may time-index each depth measurement 13 or preferably each gravity measurement 11 described later, for tidal, drift and reference corrections of the measurements.

Figure 2:
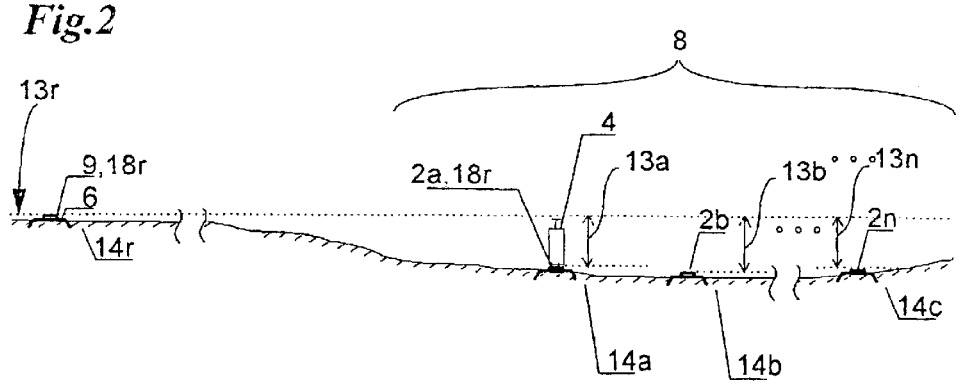
FIG. 2 illustrates a setup of instrument stations at benchmarks at the seabed.

The top of the seabed may be very loose and unconsolidated, being a bad basis for gravity measurements. In this method, it is necessary to take depth measurements $13a,13b, \ldots ,13n$ relative to the locally consolidated seabed, i.e. the seabed which is stable relative to the immediately underlying geological consolidated ground. To achieve structurally stable survey stations $2a,2b, \ldots ,2n$, these are arranged on benchmarks $6a,6b, \ldots ,6n$, the benchmarks preferably built in concrete, arranged at the seabed. Such benchmarks are illustrated in detail in FIG. 5, and are also illustrated at the seabed in FIGS. 1b, 2 and 3. Each depth measurement $13a,13b, \ldots ,13n$ is conducted on such a survey station $2a,2b, \ldots ,2n$ arranged on a benchmark $6a,6b, \ldots ,6n$. Each benchmark is having fixed vertical and horizontal position relative to the local sea-bed $14a,14b, \ldots ,14n$. Even though the very top of the sedimentary layers may be loose and unconsolidated, each benchmark according to the invention may sink to settle, and will be consolidated in the sediments before commencement of the first measurement series $S_1$.

Short-term depth variations comprises the effects of tides, local currents and air pressure variations. In order to handle short-term depth variations during a measurement series $S_i$, at least one stationary time-indexed short-time local reference depth measurement series $19r$ may conducted at a short-term local reference station $18r$ at such a benchmark 6. Preferably there are several such measurement series $19r$ being conducted during each separate measurement series $S_i$. The stationary short-time local reference depth measurement series $19r$ are preferably continuous, and are used for correcting each depth measurement $13a,13b, \ldots ,13n$ for short-time (e.g. tidal) depth variations occuring during each separate measurement series $S_i$.

In order to monitor compaction or seafloor subsidence, the depth measurements $13,19r$ are conducted relative to at least one depth measurement 13r at a reference station 9 arranged on the seabed 14r outside the survey area 8. This reference depth measurement is taken at least once during each measurement series $S_1$. The reference station 9 must be arranged at a distance from the reservoir 8 far enough to being unaffected by long-term effects taking place due to seabed subsidence or compaction in the reservoir 1 during the series of measurements $S_1, \ldots, S_m$, but near enough both with respect to depth and distance to be reached within reasonable time during each series of measurements, and situated at a depth comparable to the depth of the survey area to reduce the depth span and most of all to reduce drift of the gravity meter and to avoid uncertainty with respect to ground density for gravity elevation corrections.

The seafloor subsidence may be monitored as a difference of relative depth values $\Delta d$ or $15_2, \ldots, 15_m$ having occured during the time $\Delta t$ and interpreted in terms of compaction in the reservoir 1.

In a preferred embodiment of the invention, the stationary short-time local reference depth measurement 19r series is conducted by at least one separate depth meter 17r arranged at at least one survey station 18, which may be at least one of the survey stations 2 in the survey area 8.

The instrument 17r measuring the reference depth measurement series 19r is preferably a continuously registering and logging depth meter. The measurements 19r may be used for tidal corrections. Predicted or calculated tidal corrections without local measurements may not be sufficiently accurate for use in the method of the invention. In a preferred embodiment of the invention, preferably three separate depth meters $17r_1$, $17r_2$ and $17r_3$ are spread at separate short-term reference stations $18r_1$, $18r_2$ and $18r_3$ distributed over the survey area 8 to monitor the tidally and geographically varying series of depth measurements 19r. The three separate continuous and time indexed depth measurement series $19r_1, 19r_2, 19r_3$ may be used with a tidal model for interpolating the local tidal depth for correcting each time-indexed depth measurement 13 at each station 2.

Preferably, at least one stationary short-time local reference depth measurement 19r series is conducted at a short-term local reference station 18r being identical to or co-located with the reference station 9 arranged on the seabed 14r outside the survey area 8.

Gravity Combined with Depth Measurements

Having the depth measurements available for controlling or monitoring the gravity effect of the sea-water masses and of the seafloor subsidence, monitoring parameters representing density and/or mass distribution in an underground sub-sea petroleum reservoir 1 is possible by means of gravimetric measurements 11 with a mobile gravity sensor 10 as described above, for use with an ROV 5 on the sea-bed 14 of a survey area 8 covering the petroleum reservoir 1. The novel features of the method according to the invention are the following steps comprising gravity measurements:

Including, during the same measurements series $S_1, \ldots, S_m$, relative gravmetric measurements $11a, 11b, \ldots, 11n$, preferably acquired simultaneously with the depth measurements $13a, 13b, \ldots, 13n$.

Each gravity measurement $11a, 11b, \ldots, 11n$ is conducted on essentially the same survey station $2a, 2b, \ldots, 2n$ arranged on the benchmarks $6a, 6b, \ldots, 6n$ as for the depth measurements $13a, 13b, \ldots, 13n$.

The gravity measurement 11 is conducted relative to at least one pair of reference gravity measurement 11r and a reference depth measurement 13r or 19r at a reference station 9 or 18.

The relative gravimetric measurements 11 are corrected for the corresponding long-term and short-term relative depth measurements 13 or 19r and provides depth corrected relative gravity values $21a, 21b, \ldots 21n$.

The relative gravity values 21 are corrected for the effect of seabed subsidence $15_2, \ldots, 15_m$ as calculated on the basis of the relative depth measurements $13a, 13b, \ldots, 13n$ during the long-term time $\Delta t$.

The difference of depth corrected relative gravity values $\Delta g$ or $\Delta 21_2, \Delta 21_3, \ldots, \Delta 21_m$ having occured during the long-term time $\Delta t$ may be interpreted in terms of parameters representing a mass density change and/or a mass displacement in the reservoir 1.

The time interval $\Delta t$ between at least the first and the last measurement series may be on the order of months, one year or longer time. In order to monitor gravity effects, the separation in time $\Delta t$ between the measurement series $S_1, \ldots, S_m$ must be sufficient for or characteristic of a significantly detectable change of gravity $\Delta g$ to take place in the reservoir, the change of gravity being due to a change of mass density. Such a long time span would normally be the same as for a significantly measurable seafloor subsidence to take place, but is no limiting condition for the gravity method to work. A significantly detectable change of gravity $\Delta g$ may be imagined to take place due to a density change or fluid movement occuring in the reservoir, without any significantly measurable seafloor subsidence or even seafloor rise due to other geological processes.

Figure 4:
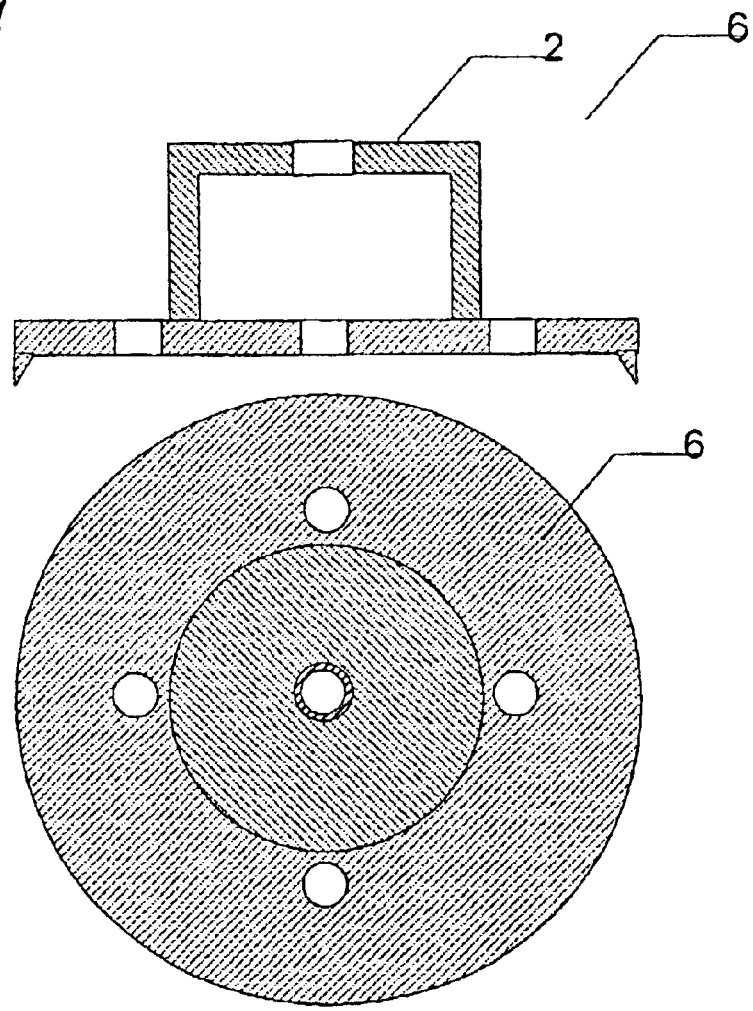
FIG. 4 illustrates a benchmark according to the invention, for installation on and settling into the seabed sediment surface.
Figure 4:
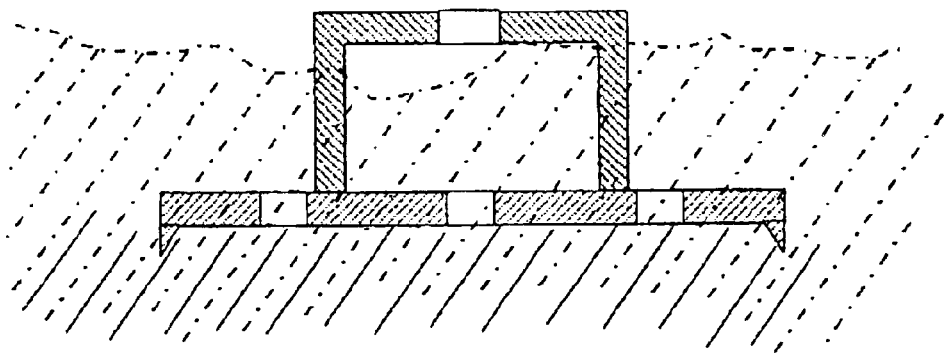

Each gravity measurement $11a, 11b, \ldots, 11n$ is conducted with the gravity and depth sensors 10,12 placed on a survey station $2a, 2b, \ldots, 2n$. The survey stations are arranged each on their benchmark $6a, 6b, \ldots, 6n$ having fixed vertical and horizontal position relative to the local sea-bed $14a, 14b, \ldots, 14n$. The benchmarks are arranged in known and marked positions on the seabed in sufficient time before the gravity survey series $S_1, \ldots, S_m$ for the benchmarks to settle firmly and stably at the seabed. One preferred embodiment of a benchmark 6 is shown in FIG. 4. The benchmark 6 has a skirt below the outer periphery, and a somewhat elevated top surface constituting the survey station 2. The baseplate of the benchmark 6 is perforated in order for water and loose sediment to be pressed through the benchmark during the settling in the sediments. The benchmark is made in concrete and is arranged to sink into the sediment leaving at least the elevated top surface above the sediments when settled.

Figure 1C:
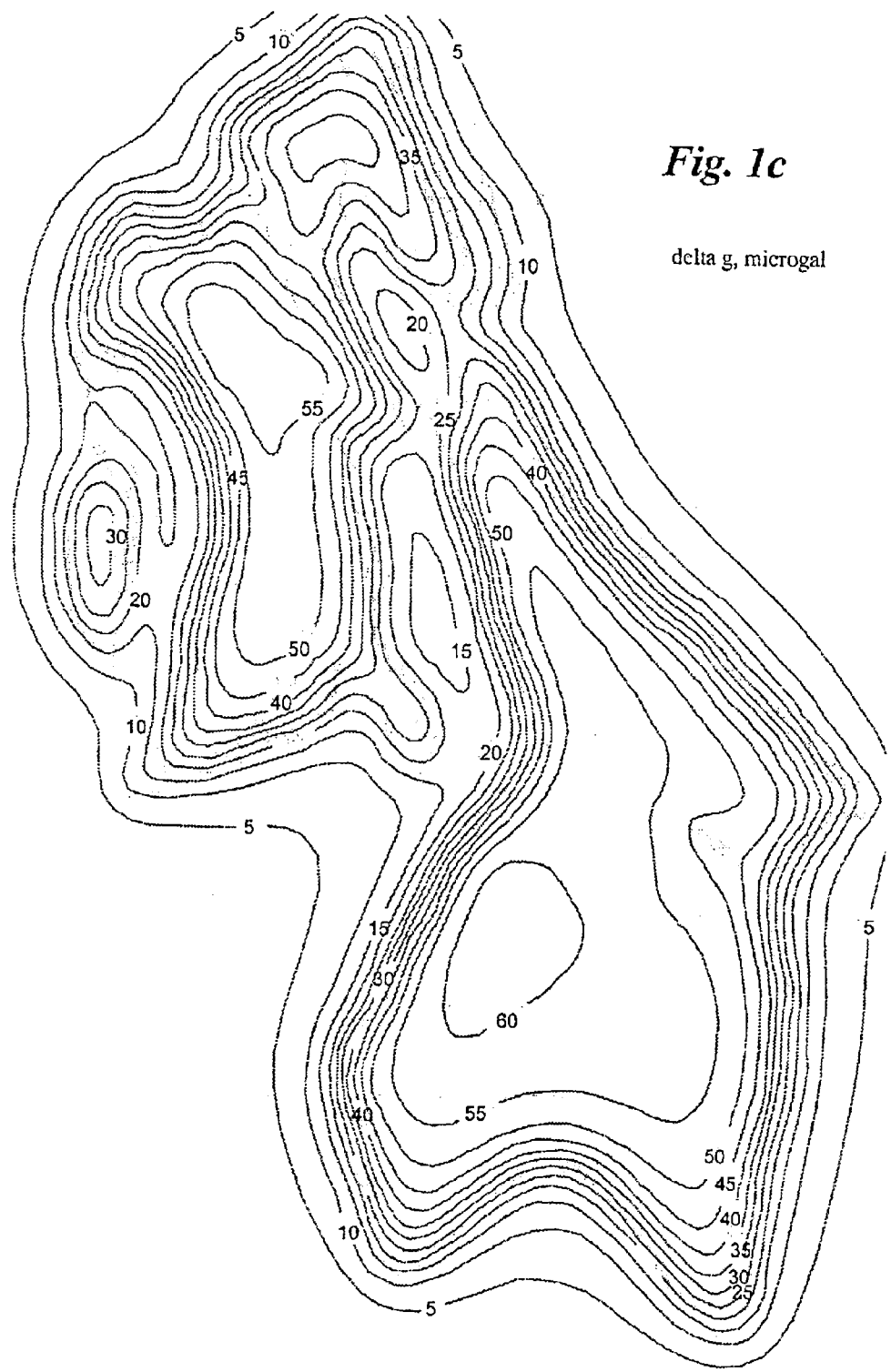
FIG. 1c illustrates a modeled gravity field change due to a change in a reservoir.

The gravity and depth measurement 11,13 are made relative to at least one gravity and depth measurement 11r,13r at a reference station 9 arranged on the seabed 14r outside the survey area 8. This is illustrated in the simplified FIG. 2. The reference station 9 is far enough to be unaffected by gravity effects taking place due to mass changes in the reservoir 1, e.g. due to an elevating gas/water contact GWC or an elevating oil/water contact OWC. A modelled example of the relative gravity effect of a 10 meters uplift of the gas/water contact in the Troll reservoir is shown in FIG. 1c. The relative gravity values are shown in microGals. One can see that the gravity image is a smoothed image of the reservoir contour. The station grid has a spacing of about 4 km, with the stations 2 indicated by crosses.

The relative gravimetric measurements 11 must be corrected for the corresponding relative depth measurements 13 producing depth corrected relative gravity values $21a, 21b, \ldots, 21n$.

In order to discriminate a gravity effect due to subsidence from gravity effect due to a mass density change and/or mass displacement in the reservoir 1, the relative gravity values 21 should be corrected back to a datum plane, for the effect of seabed subsidence $15_2, \ldots, 15m$ as calculated on the basis of the relative depth measurements $13a, 13b, \ldots, 13n$ during the time $\Delta t$. This subsidence measurement and correction is illustrated in FIG. 3. The datum plane illustrated is a plane through the reference station 9 at the seabed 14r outside the survey area 8, but other datum planes closer to the stations 2 may serve the correction purpose better.

After correcting the gravity values 11 for subsidence measurement, one can interpret a difference of depth corrected relative gravity values $\Delta g$ or $\Delta 21_2, \Delta 21_3, \ldots 66\ 21_m$ having occured during the time $\Delta t$ in terms of parameters representing a mass density change and/or a mass displacement in the reservoir 1. This displacement is illustrated in FIG. 1b by the gas/water contact from the first series $S_1$ being indicated by $GWCt_1$ and the gas/water contact from the second series $S_m$ being indicated by $GWCt_m$. This rise of GWC may be calculated iteratively until the modelled gravity change fits the measured gravity change, or may be inversely modeled directly from the data. The density change at the gas-water contact level may also be inferred from two-dimensional spatial deconvolution of the seafloor gravity data. Several methods for modeling of gravity data are known from the literature, and such methods are not described in detail here.

During each and every measurement series $S_1, S_2, \ldots, S_m$ the gravity sensor 10 and the depth sensor 12 are arranged with a fixed relative elevation in their operational position on the station 2,9. This is made practical by arranging the depth sensors 12 on the outside the pressure housing of the gravity meter as illustrated in FIG. 1a.

The gravity sensor 10 and the depth sensor 12 are carried by means of an ROV 5 from one station 2, 9 to another station 2, 9 between one pair of a relative gravimetric and depth measurements 11,13 and the next pair of a relative gravimetric and depth measurement 11,13 in one measurement series S. By using a cable-powered ROV 5 there is no limit to the size of the survey area.

According to a preferred embodiment of the invention, in order not to disturb the sensors, particularly the gravity sensor, the ROV 5 separates from and leaves the gravity sensor 10 (and the depth sensor 12) before the commencement of each relative gravimetric measurement 11 in order not to affect the gravimetric measurment 11.

According to the preferred embodiment, the relative gravimetric measurement 11 from the gravity sensor 10 and the depth measurement 13 from the depth sensor 12 are transferred from the unit 4 to the ROV 5 via a "ROVDOG" umbilical cable 53.

According to the preferred embodiment, the relative gravimetric 11 and depth measurements 13 are transferred via an ROV umbilical cable 51 to a surface vessel 7. By this arrangement the crew can monitor online and control the sampling of gravity and depth data.

The gravimetric measurements 11 are time-indexed and corrected for the gravity sensor's 10 drift with respect to time by other time-indexed gravimetric measurements 11, 11r taken before and/or later with the same gravity sensor 10 at a survey station 2 or reference station 9 during the same actual period of time $t_i$, giving drift-corrected gravimetric measurements $11_t$ for further processing to produce corrected gravity values 21. The advantage by the present method is that the reference station may be reoccupied often during the survey. In this way the drift rate of the gravity meter can be monitored.

According to a preferred embodiment of the invention, the depth measurements 13 arise from pressure measurements 23 converted according to the actual water density, the depth sensors 12 actually being pressure sensors. Optionally, a measured water density distribution depth profile is taken into account.

A tidal water correction can be made for the corresponding relative depth measurements 13 on each series $S_i$ of the gravimetric measurements 11 in order to obtain corrected relative gravity values 21. The tidal water correction can be made theoretically on the basis of tidal modelling, or based upon gravity measurements during reoccupation of reference stations 9 or gravity stations 2.

Further Description of the Mechanical Structure

Each gimbal frame 36x, 36y is driven by an actuator 38x, 38y. The actuator 38x may rotate the gimbal frame 36x about the x-axis 37x, and the actuator 8y is arranged to rotate the gimbal frame 36y about the y-axis 37y. Each actuator 38x, 38y comprises a DC motor-driven lead screw 80x, 80y whose position is monitored by a linear potentiometer 82x, 82y. Each linear potentiometer 82x, 82y gives a readout 83x, 83y which is transmitted via a signal conductor 84x, 84y to a control device 88 arranged to control the actuators 8x, 8y.

Electrical System

Control of the system is overseen by a microcontroller 30 (Z-World model BL1700) being a single-board computer comprising four serial ports, 10 12-bits A/D converters, and 64 digital I/O lines. The A/D channels are arranged to monitor signals comprising the following:

a) A temperature signal 61 from a temperature sensor 60;

b) A sensor coarse tilt signal 65 from a coarse tilt sensor 64;

c) A sensor fine tilt signal 69 from a fine tilt sensor 68;

d) An ambient temperature signal 71 from a temperature sensor 60;

e) Gimbal orientation sensor signals 73x, 73y (different from the signal 83x, 83y mentioned above) from gimbal orientation sensors 72x, 72y giving the orientation of gimbals 80x, 80y;

f) A motor current size signal 75 from a motor current sensor 74;

g) a leak signal 91 from a leak sensor 90.

| Component and function list: | |
|---|---|
| 1 | sub-sea reservoir. |
| 2 | survey station (2a, ..., 2n) on benchmark 6 on seabed 14. |
| 3 | gravity sensor system comprising gravity sensor 10. |
| 4 | ROVDOG comprising 3 and depth (pressure) sensors 12. |
| 5 | ROV. |
| 6 | benchmark on seabed 14. |
| 7 | surface (or submarine) vessel. |
| 8 | survey area. |
| 9 | Fixed reference station with respect to the seabed 14r. |
| 10 | gravity sensor. |
| 11 | relative gravimetric measurements (11a, ..., 11n). |

| | -continued | |
|---|---|---|
| | Component and function list: | |
| 12 | depth sensor. | |
| 13 | relative depth measurements (13a, ..., 13n). | |
| 14 | local survey area seabed (14a, ..., 14n). | |
| | reference station seabed (14r). | |
| 15 | relative depth values ($\Delta d$) or ($15_2$, ..., $15_m$) | |
| 16 | clock (16) | |
| 17 | separate depth meter (17r) | |
| 18 | short-term local reference station. | |
| 19 | short-time local reference depth measurement series. | |
| 20 | | |
| 21 | corrected gravity values (21a, 21b, ..., 21n). | |
| 22 | quartz pressure gauges | |
| 23 | pressure measurements (23a, 23b, ..., 23n). | |
| 24 | | |
| 25 | | |
| 26 | | |
| 27 | | |
| 28 | | |
| 29 | | |
| 30 | microcontroller. | |
| 31 | | |
| 32 | | |
| 33 | difference of relative depth values ($\Delta d$) or ($\Delta 33_2$, $\Delta 33_3$, ..., $\Delta 33_m$). | |
| 34 | water-tight housing. | |
| 35 | thermal isolation. | |
| 36x, y | double-gimbal frames orthogonally arranged. | |
| 37x, y | x-axis, y-axis 37x, 37y. | |
| 38 | actuators 38x, 38y for gimbal frames 36x, 36y. | |
| 39 | | |
| 40 | | |
| 41 | | |
| 42 | | |
| 43 | | |
| 44 | | |
| 45 | | |
| 46 | | |
| 47 | | |
| 48 | | |
| 49 | | |
| 50 | | |
| 51 | ROV umbilical cable | |
| 52 | | |
| 53 | ROVDOG umbilical cable | |
| 54 | | |
| 55 | | |
| 56 | | |
| 57 | | |
| 58 | | |
| 59 | | |
| 60 | temperature sensor. | |
| 61 | temperature signal from 60. | |
| 62 | | |
| 63 | | |
| 64 | coarse tilt sensor. | |
| 65 | coarse tilt signal from 64. | |
| 66 | | |
| 67 | | |
| 68 | fine tilt sensor. | |
| 69 | fine tilt signal from 68. | |
| 70 | ambient temperature sensor. | |
| 71 | ambient temperature signal from 70. | |
| 72 | | |
| 73 | | |
| 74 | | |
| 75 | | |
| 76 | | |
| 77 | | |
| 78 | | |
| 79 | | |
| 80 | motor-driven lead screw 80x, 80y. | |
| 81 | | |
| 82 | linear potentiometer 82x, 82y monitoring 80x, 80y. | |
| 83 | readout 83x, 83y from 82. | |
| 84 | signal conductor 84x, 84y. | |
| 85 | | |
| 86 | | |
| 87 | | |
| 88 | control device. | |
| 89 | | |
| 90 | leak sensor. | |
| 91 | leak signal from 90. | |

What is claimed is:

1. A method for monitoring possible subsidence of a seabed (14) of a survey area (8) caused by compaction of an underground hydrocarbon reservoir (1), comprising:

conducting at least two measurement series ($S_1$, ..., $S_i$, ..., $S_m$) each comprising at least one time-indexed depth measurement (13a,13b, ..., 13n), with a separation in time $\Delta t$ between the at least two measurement series on the order of months or years;

conducting each depth measurement (13a,13b, ..., 13n) on a survey station (2a,2b, ..., 2n) arranged on a benchmark (6a,6b, ..., 6n) having fixed vertical and horizontal position relative to the local sea-bed (14a, 14b, ..., 14n);

within each measurement series ($S_i$), conducting at least one stationary time-indexed short-time local reference depth measurement series (19r) on at least one short-term local reference station (18r) on at least one benchmark (6), for correcting each depth measurement (13a,13b, ..., 13n) for short-time depth variations;

conducting the depth measurements (13,19r) relative to at least one depth measurement (13r) at a reference station (9) arranged on the seabed (14r) outside the survey area (8) at least once during each measurement series ($S_i$), the reference station (9) essentially being unaffected by long-term effects taking place due to compaction in the reservoir (1) during the series of measurements ($S_1$, ..., $S_i$, ..., $S_m$).

2. Method according to claim 1, comprising interpreting a difference of relative depth values ($\Delta d$) or ($15_2$, ..., $15m$) having occured during the time ($\Delta t$) in terms of compaction in the reservoir (1).

3. Method according to claim 1, the time between at least the first and the latest measurement series ($S_1$, ..., $S_m$) being characteristic of a significantly detectable change of seafloor elevation due to compaction to take place in the reservoir (1).

4. Method according to claim 1, the depth measurements (13a, 13b, . . . , 13n) being deducted from pressure measurements (23a, 23b, . . . , 23n).

5. Method according to claim 1, the stationary short-time local reference depth measurement series (19r) being continuous.

6. Method according to claim 1, the reference station (9) essentially being close to the survey area (8) and situated at a depth comparable to the depth of the survey area.

7. Method according to claim 1, comprising the stationary short-time local reference depth measurement (19r) series being conducted by at least one separate depth meter (17r).

8. Method according to claim 1, comprising at least one stationary short-time local reference depth measurement (19r) series being conducted at a short-term local reference station (18r) being identical to or co-located with the reference station (9) arranged on the seabed (14r) outside the survey area (8).

9. Method according to claim 1, comprising arranging three or more separate depth meters ($17r_1, 17r_2, 17r_3$) at separate short-term reference stations ($18r_1, 18r_2, 18r_3$) distributed geographically over the survey area (8) to monitor the tidally varying series of depth measurements (19r), using the separate continuous and time indexed depth measurement series ($19r_1, 19r_2, 19r_3$) with a tidal model for interpolating the local tidal depth for correcting each time-indexed depth measurement (13) at each station (2).

10. A method according to claim 1, further comprising:
including, in at least two of the measurements series ($S_1, \ldots, S_i, \ldots S_m$), relative gravimetric (11a,11b, . . . ,11n) measurements simultaneously with the depth measurements (13a,13b, . . . ,13n);
conducting each gravity measurement (11a,11b, . . . ,11n) on the survey stations (2a,2b, . . . ,2n) arranged on the benchmarks (6a,6b, . . . ,6n);
conducting the gravity measurement (11) relative to at least one reference gravity measurement (11r) at the reference station (9);
correcting the relative gravimetric measurements (11) for the corresponding long-term and short-term relative depth measurements (13,19r) producing depth corrected relative gravity values (21a,21b, . . . ,21n);
correcting the relative gravity values (21) for the effect of seabed subsidence ($15_2, \ldots, 15_m$) as calculated on the basis of the relative depth measurements (13a,13b, . . . ,13n) during the long-term time Δt; and
interpreting a difference of depth corrected relative gravity values (Δg) or ($\Delta 21_2, \Delta 21_3, \ldots, \Delta 2 l_m$) having occurred during the long-term time (Δt) in terms of parameters representing a mass density change and/or a mass displacement in the reservoir (1).

11. A method according to claim 5, in which during each measurement series ($S_1, S_2, \ldots, S_m$) the gravity sensor (10) and the depth sensor (12) are arranged with a fixed relative elevation in their operational position on the station (2, 9, 18).

12. A method according to claim 5, in which the gravity sensor (10) and the depth sensor (12) are carried by means of an ROV (5) from one station (2, 9) to another station (2, 9) between one pair of a relative gravimetric and depth measurements (11,13) and the next pair of a relative gravimetric and depth measurement (11,13) in one measurement series (S).

13. A method according to claim 12, in which the ROV (5) is separate from the gravity sensor (10) during each relative gravimetric measurement (11) in order not to affect the gravimetric measurment (11).

14. A method according to claim 12, in which the relative gravimetric measurement (11) from the gravity sensor (10) and the depth measurement (13) from the depth sensor (12) are transferred to the ROV (5).

15. A method according to claim 14, in which the relative gravimetric (11) and depth measurements (13) are transferred via an ROV umbilical cable (53) to a surface vessel (7).

16. A method according to claim 10, in which the gravimetric measurements (11) are time-indexed and corrected for the gravity sensor's (10) drift with respect to time by other time-indexed gravimetric measurements (11, 11r) taken before and/or later with the same gravity sensor (10) at a survey station (2) or reference station (9,18) during the same actual period of time ($t_i$), giving drift-corrected gravimetric measurements ($11_t$) for further processing to produce corrected gravity values (21).

17. A method according to claim 4, wherein the depth measurements (13) arise from pressure measurements (23) converted according to the actual water density and optionally to the measured water density distribution depth profile.

18. Device for monitoring possible subsidence of a seabed (14) of a survey area (8), and gravity changes in an underlying petroleum reservoir, comprising:
a depth sensor (12), adapted for being carried by an ROV (5), to be placed on survey stations (2) on benchmarks (6) at the seabed (14) for conducting depth measurements (13);
a water-tight pressure housing (34) with a gravity sensor (10) for making relative gravity measurements (11);
in which the gravity sensor (10) and the depth sensor (12) are arranged in a mutually fixed elevation in their operational position, and adapted for being carried by means of an ROV (5) from one seabed station (2, 9) to another seabed station (2, 9) between one pair of a relative gravimetric and depth measurements (11,13) and the next pair of a relative gravimetric and depth measurements (11,13).

19. Device according to claim 18, the depth sensor (12) comprising quartz pressure gauges (22).

20. Device according to claim 18, the number of pressure gauges (22) being three.

21. Device according to claim 18, comprising a clock (16) for time-indexing the depth measurements (13).

22. Device according to claim 21, comprising double gimbal frames (36x,36y) orthogonally arranged for adjusting the verticality of the gravity sensor (10) around two axes (37x, 37y).

23. Device according to claim 22, comprising actuators (38x,38y) for turning the gravity sensor (10) in the gimbal frames (36x,36y).

24. Device according to claim 21, comprising coarse and fine tilt sensors (64,68) for giving a coarse and fine tilt signal (65,69) for the deviation from verticality for the gravity sensor (10).

25. Device according to claim 21, comprising a signal cable (53) between the depth sensor (12) and the gravity sensor (10), and the ROV (5), arranged for transmitting the depth measurement (13) and the relative gravity measurement (11) from the sensors (10,12) to the ROV.

26. Device according to claim 25, the signal cable (53) also conducting the tilt signals (65,69) from the tilt sensors (64,68) of the gravity sensors to the ROV (5).

27. Device according to claim 18, at least the gravity sensor (10) adapted for being released from the ROV (5) during each relative gravimetric measurement (11) in order not to be disturbed by the ROV (5).

28. A device according to claim 18, in which the relative gravimetric measurement (11) from the gravity sensor (10) and the depth measurement (13) from the depth sensor (12) are transferred to the ROV (5) by an umbilical cable (53).

29. A device according to claim 14, in which the relative gravimetric (11) and depth measurements (13) are transferred via an ROV umbilical cable (51) to a surface vessel (7).

* * * * *